United States Patent
Kiest, Jr.

(10) Patent No.: US 12,025,257 B2
(45) Date of Patent: *Jul. 2, 2024

(54) PIPE RENOVATION FILTRATION SYSTEM

(71) Applicant: PIPE LINING ENTERPRISES, INC., Fort Lauderdale, FL (US)

(72) Inventor: Larry W. Kiest, Jr., Fort Lauderdale, FL (US)

(73) Assignee: PIPE LINING ENTERPRISES, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,452

(22) Filed: Mar. 8, 2023

(65) Prior Publication Data

US 2023/0220942 A1    Jul. 13, 2023

Related U.S. Application Data

(63) Continuation of application No. 17/301,785, filed on Apr. 14, 2021, now Pat. No. 11,624,469.

(60) Provisional application No. 63/009,698, filed on Apr. 14, 2020.

(51) Int. Cl.
*F16L 55/18* (2006.01)
*B01D 46/00* (2022.01)
*F16L 55/165* (2006.01)

(52) U.S. Cl.
CPC .......... *F16L 55/18* (2013.01); *B01D 46/0005* (2013.01); *F16L 55/1652* (2013.01)

(58) Field of Classification Search
CPC ... F16L 55/18; F16L 55/1652; B01D 46/0005
USPC ........................................................ 138/97
See application file for complete search history.

(56) References Cited

U.S. PATENT DOCUMENTS

| | | |
|---|---|---|
| 4,250,609 A | 2/1981 | Beaudoin |
| 5,431,715 A | 7/1995 | Teague |
| 5,458,663 A | 10/1995 | Teague |
| 10,233,814 B2 | 3/2019 | Wasif |
| 11,624,469 B2 * | 4/2023 | Kiest, Jr. ........... F16L 55/18 138/97 |
| 2013/0139922 A1 | 6/2013 | D Hulster |
| 2016/0078743 A1 | 3/2016 | Tanner |

(Continued)

FOREIGN PATENT DOCUMENTS

| | | |
|---|---|---|
| KR | 101993404 B1 | 9/2019 |
| KR | 102093850 B1 | 3/2020 |

OTHER PUBLICATIONS

AEESP Conference, "Water Pipe Repair Can Cause Toxic Air", Purdue University, 11 pages, Jun. 21, 2017.

*Primary Examiner* — David R Deal
(74) *Attorney, Agent, or Firm* — McKee, Voorhees & Sease, PLC

(57) ABSTRACT

A filtration system is used with a pipe repair system, such as a cured-in-place pipe lining system. Before, during, and/or after the repair of the pipe with the pipe lining system, air from inside the pipe is directed into a filtration system. The filtration system removes contaminants, such as VOCs and other harmful gases, particles, and the like, with a filter, and then the filtered air is exhausted from the system. The filter can be a carbon filter or other filter that can remove harmful or hazardous materials and particles from the air prior to exhaust. The air is also sensed to acquire information, such as temperature, pressure, composition, flow, or the like.

17 Claims, 9 Drawing Sheets

(56) References Cited

U.S. PATENT DOCUMENTS

| | | |
|---|---|---|
| 2018/0003332 A1 | 1/2018 | Rosemont |
| 2018/0354206 A1 | 12/2018 | Rosemont |
| 2019/0063662 A1 | 2/2019 | Noggle |
| 2019/0094101 A1 | 3/2019 | Spiegel |
| 2021/0102655 A1 | 4/2021 | Whelton |

* cited by examiner

PIPE RENOVATION FILTRATION SYSTEM

CROSS REFERENCE TO RELATED APPLICATIONS

This application claims priority under 35 U.S.C. § 119 to provisional patent application U.S. Ser. No. 63/009,698, filed Apr. 14, 2020. The provisional patent application is herein incorporated by reference in its entirety, including without limitation, the specification, claims, and abstract, as well as any figures, tables, appendices, or drawings thereof.

This is a continuation patent application which claims priority under 35 U.S.C. § 120 to U.S. Ser. No. 17/301,785, filed Apr. 14, 2021.

TECHNICAL FIELD

The invention relates generally to pipe repair. More particularly, but not exclusively, the invention relates to methods, systems, and/or apparatus for sensing, measuring, and/or filtering gases and/or fluids associated with pipe repairs, such as cured in place pipe repairs.

BACKGROUND

As the infrastructure of major cities and towns in the developed world age, the sewer systems weaken. Pipe degradation, system blockage, water infiltration, and sewer leakage are major problems that aging sewer systems experience. As these problems persist, the sewer system may eventually experience total failure and entire sections of the sewer system may collapse. As a result, sinkholes may form, and sewers may back up into homes and places of business. One method of addressing this critical infrastructure problem is the use of pipe lining techniques to rehabilitate existing sewer systems.

Cured-in-place pipelining (CIPP) is one such technique that includes rehabilitating an existing sewer system by creating a new pipe within an existing pipe. A liner, impregnated with a resinous material capable of curing and hardening, is inverted or pulled into a damaged pipe. The liner is pressed against the wall of the existing pipe, and the resinous material is allowed to cure and harden. The result is a replacement pipe having the older pipe or "host pipe" on the exterior. The cured-in-place pipe acts to alleviate the problems caused by structural defects and blockages in the existing sewer system. Even in sewer systems where the main pipes have been rehabilitated with a cured-in-place pipe or other pipe liners, problems still arise.

Conventional sewer lines include a main pipe which extends along the street in a direction parallel to the street. Each house has a lateral pipeline that extends from the home and connects to the main pipeline. U.S. Pat. No. 9,562,339 provides a way in which the lateral pipe is lined using CIPP from a main pipe, which is a manhole. Still other patents, such as U.S. Pat. Nos. 9,435,479 and 8,550,121, among others, disclose lining processes.

It is often desirable to provide a clean-out to the lateral pipe adjacent the main sewer pipe. Many lateral pipes have been buried without such a clean-out. One method to provide a clean-out is to make a wide and extensive excavation so that persons can enter the excavation and attach a clean-out pipe to the lateral pipe. This results in considerable disruption to the soil and the yard around the house. Another option utilizes minimally invasive methods, for example, U.S. Pat. Nos. 9,151,410 and 6,705,801 are but some of the ways in which a clean-out is provided to a pipe.

CIPP utilizes a liner tube or tubes saturated with a curable resin, to repair the pipe. The curing of the resin can be made without a heat source by promoting and catalyzing the resin. It is more common to cure the catalyzed resin by using controlled heat such as a steam/air mixture that inflates, expands, and cures the liner. The resin can contain volatile organic compounds (VOCs), such as styrene. The steam/air mixture becomes contaminated as it passes through the resin saturated liner tube and discharged from the end of the liner out into the open air. The contaminated steam/air mixture is typically discharged as an exhaust at a manhole when the main sewer is renewed using CIPP. Likewise, the steam/air mixture is discharged through a cleanout as a lateral sewer service pipe is renewed using CIPP.

The release of such emissions can be hazardous and has the ability to create health issues or other areas of contamination. The workers and other individuals in the proximity of the repair could thus be exposed to the hazardous air being released from the pipe.

In addition to the discharge of pressurized contaminated steam/air being released to the open air, there is another concern; air in service pipes become contaminated when a main sewer pipe is renewed. This occurs as the resin saturated liner used to renew the main pipe covers the lateral service pipe opening providing a passageway for the VOCs to migrate up into an attached building. The contaminated air can enter the building through the building plumbing such as drain, waste, and vent piping. The VOC contaminated emissions can enter all sorts of buildings, such as residential homes, apartment buildings, hotels, restaurants, schools, and other facilities through piping defects, dry fixture traps, and other openings in the piping system. Public utilities have been using CIPP now for 50 years and most communities have reports where a resident has become ill and had been taken to a hospital. CIPP air quality issues are predominately caused by styrene, a substantial toxic ingredient used in the resin. At 700 ppm, styrene gas becomes immediately dangerous to life and health. Styrene gas's effects on the brain include a feeling of drunkenness, changes in color vision, tiredness, confusion, and problems maintaining balance.

While patents have attempted to address the issue, such as U.S. Ser. No. 15/071,244, problems still exist.

Still further, in typical CIPP repair systems, when steam is used, it is exhausted via a cleanout, lateral pipe, or a downstream manhole of the pipe system. As the steam is generally pressurized, upon release, a plume of steam may be exhausted. The aesthetic of such an exhaust can be jarring and can incite fear in people who may not be aware of the repair and process.

Therefore, there is a need in the art for a method, apparatus, and/or system to filter the air in and around a pipe being repaired, such as by CIPP, which reduces the exposure of hazardous or potentially hazardous materials into the air. There is an additional need to mitigate fear of a repair process by reducing the appearance of a plume of steam being exhausted via the pipe system.

SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present disclosure to improve on or overcome the deficiencies in the art.

It is another object, feature, and/or advantage to provide a filtration system for use in the repair or one or more pipes, such as by CIPP repair.

It is yet another object, feature, and/or advantage to filter the air within a cured in place pipe liner.

It is still another object, feature, and/or advantage to monitor the emissions caused by resin containing VOC's as an aspect of the pipe repair.

It is another object, feature, and/or advantage to monitor one or more of temperature of air in a pipe, pressure of air in a pipe, composition of air in a pipe, detection of one or more gases in a pipe, or a combination thereof.

It is a further object, feature, and/or advantage to communicate one or more detected or sensed aspects of the pipe repair.

It is still a further object, feature, and/or advantage to communicate to a user interface, which can be local or remote.

It is still yet a further object, feature, and/or advantage to provide an apparatus that improves safety.

It is still yet a further object, feature, and/or advantage to provide an apparatus that is cost effective.

It is still yet a further object, feature, and/or advantage to provide an apparatus that is reliable and durable and has a long usable life.

It is still yet a further object, feature, and/or advantage to provide an apparatus which is easily used and reused.

It is still yet a further object, feature, and/or advantage to provide an apparatus that is easily manufactured, assembled (installed), disassembled (uninstalled), repaired, replaced, stored, transported, and cleaned.

It is still yet a further object, feature, and/or advantage to provide an apparatus that is aesthetically pleasing.

It is still yet a further object, feature, and/or advantage to incorporate an apparatus into a system accomplishing some or all of the previously stated objectives.

It is still yet a further object, feature, and/or advantage of the invention to employ an order of operations which can be critical to achieving the highest quality CIPP possible.

These or other objects, features, and/or advantages of the present invention will be apparent to those skilled in the art after reviewing the following detailed description of the illustrated embodiments, accompanied by the attached drawings.

According to some aspects of the disclosure, a filtration system for use with a cured-in-place pipe repair system includes a fitting for connecting to a component of the cured-in-place pipe repair system or the pipe to be renewed using CIPP. The fitting including an exhaust, and a filter operatively connected to the fitting to filter air before it leaves via the exhaust.

According to at least some of the aspects of some of the embodiments disclosed herein, a pressure source is included to direct the air mixture through the filter and out the exhaust.

According to at least some of the aspects of some of the embodiments disclosed herein, the pressure source is a blower fan or an air-compressor.

According to at least some of the aspects of some of the embodiments disclosed herein, the pressure source is a vacuum.

According to at least some of the aspects of some of the embodiments disclosed herein, the system further includes a sensor at the exhaust, and wherein the at least one sensor comprises one or more of:
  a. a temperature sensor;
  b. a pressure sensor;
  c. a chemical sensor;
  d. an air quality sensor; or
  e. a flow meter.

According to at least some of the aspects of some of the embodiments disclosed herein, the system further includes an interface operatively connected to the fitting to provide information related to the at least one sensor.

According to at least some of the aspects of some of the embodiments disclosed herein, the interface is at the fitting, remote of the fitting, or wherein there are multiple interfaces both at the fitting and remote.

According to at least some of the aspects of some of the embodiments disclosed herein, the fitting is positioned at a clean-out located on a sewer service pipe, or a manhole located on a main pipe.

According to at least some of the aspects of some of the embodiments disclosed herein, the filter comprises a carbon charcoal filter.

According to additional aspects, a method of filtering air associated with cured-in-place pipe lining includes directing air from within a cured-in-place pipe lining system towards a filtration system, filtering the air with the filtration system to remove a contaminant from the air, measuring at least one aspect of the air with at least one sensor, and exhausting the filtered air from the filtration system.

According to at least some of the aspects of some of the embodiments disclosed herein, the contaminated air is directed with a pressure source.

According to at least some of the aspects of some of the embodiments disclosed herein, the pressure source comprises: a positive pressure fan; or a vacuum.

According to at least some of the aspects of some of the embodiments disclosed herein, the method further includes communicating the at least one aspect of the air to a user interface.

According to at least some of the aspects of some of the embodiments disclosed herein, the filtration system comprises a fitting, a filter, and at least one sensor According to at least some of the aspects of some of the embodiments disclosed herein, the method includes storing the communicated aspect in a memory with a date and time.

According to at least some of the aspects of some of the embodiments disclosed herein, the filter is a carbon charcoal filter.

According to yet additional aspects, a filtration system for use with a cured-in-place pipe repair system includes a filter operatively positioned at an exhaust end of the cured-in-place pipe repair system, and at least one sensor associated with the filter to measure an aspect of an air mixture being filtered.

According to additional aspects, a filtration system for use with a cured-in-place pipe repair system includes a fitting for connecting to a component of the cured-in-place pipe repair system, the fitting including an exhaust, and at least one sensor connected to the fitting to measure an aspect of an air mixture being exhausted.

According to at least some aspects, a condensation system is included. The condensation system condenses at least some of the pressurized and/or non-pressurized steam used to aid in curing a liner to reduce the appearance of a plume of steam being exhausted. The condensation system can include a liquid bath or a radiator that cools the steam to turn at least some of the steam into tiny water droplets that appear less harmful or dangerous.

According to some aspects of the present disclosure, A method for repairing a pipe system which includes a main pipe and at least one lateral pipe extending from the main pipe comprises inspecting the main pipe using CCTV, measuring the main pipe length and diameter, and remotely inspect, measure pipe at least one lateral pipe and to locate the same; installing a two-way cleanout to provide access to the pipe system; sealing the pipe system; repairing the main pipe using cured-in-place pipe (CIPP); and repairing the at least one lateral pipe using CIPP.

According to some additional aspects of the present disclosure, the pipe system further comprises at least one manhole and the method comprises repairing the manhole with CIPP after repairing the at least one lateral pipe.

According to some additional aspects of the present disclosure, the step of inspecting the pipe system can be accomplished by using a laser to measure and a sonde transmitter/locator to map the main pipe and the at least one lateral pipe.

According to some additional aspects of the present disclosure, the method can further include installing a second, two-way cleanout spaced from a first, two-way cleanout, and positioning an inflatable plug between the first and second cleanouts.

According to some additional aspects of the present disclosure, the step of sealing the pipe system comprises chemical grouting defects in walls of the pipe system to mitigate leaks into the pipes.

According to some additional aspects of the present disclosure, before repairing the main pipe using CIPP, the main pipe can be prepared by: bypass pumping the flow from an upstream manhole of the pipe system to a downstream manhole of the pipe system; positioning a plug on an upstream side of the installed, two-way cleanout; and cleaning the main pipe to remove debris and water therefrom. Likewise, before repairing the at least one lateral pipe using CIPP, the lateral pipe can be prepared by: plugging system flow and bypass pumping the main pipe and the at least one lateral pipe; cleaning the main pipe and the at least one lateral pipe to remove debris and water; measuring the at least one lateral pipe from the two-way cleanout to the main pipe; and using the measurements to create a lateral liner to fit the at least one lateral pipe.

According to some additional aspects of the present disclosure, the step of repairing the main pipe and/or lateral pipe using CIPP comprises: impregnating a liner with a resinous material capable of curing and hardening; positioning the liner into the main pipe; and pressing the liner to the main pipe to allow the resinous material to cure and harden. The liner can be positioned in the main pipe, for example, by pulling the liner into place or inverting the liner. The liner can be inflated to press the liner tight against the pipe. A curing agent can be introduced to aid in curing and hardening the resinous material. A first gasket seal can be positioned at a junction of the main pipe and the at least one lateral pipe, and a gasket second seal can be positioned at a distal location away from the junction. The step of repairing the at least one lateral pipe using CIPP can further comprise inserting an inflatable plug through the cleanout and positioning in the lateral pipe to stop system flow and prevent emissions from migrating up a lateral pipe and entering a building and connecting a filter at the cleanout to filter emissions from the at least one lateral pipe during repair thereof. These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

Figure 1:
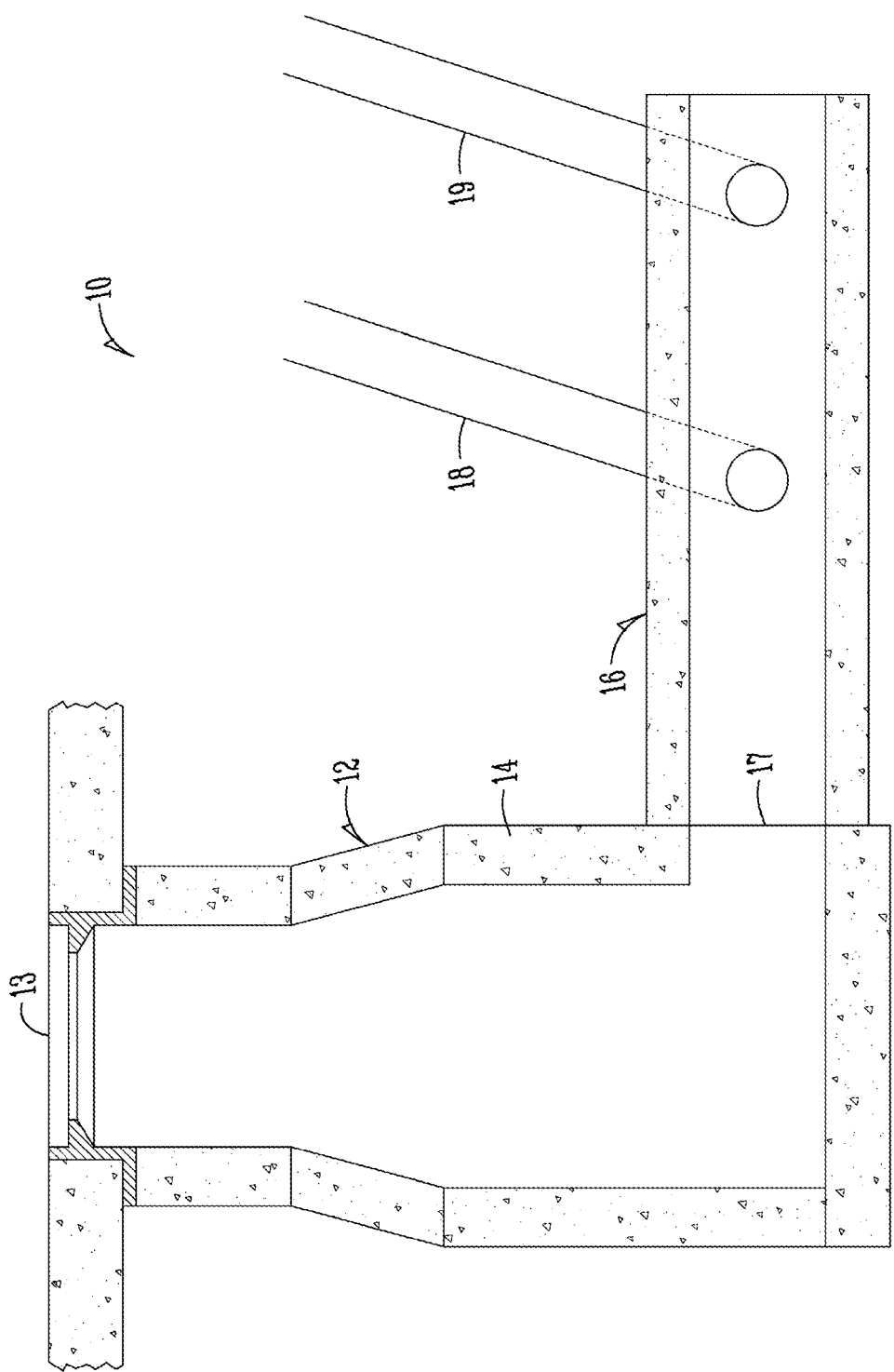
FIG. 1 is a sectional view of an exemplary sewer system including a manhole, main pipe, and multiple service or lateral pipes.

An artisan of ordinary skill in the art need not view, within isolated figure(s), the near infinite distinct combinations of features described in the following detailed description to facilitate an understanding of the present disclosure.

DETAILED DESCRIPTION

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include plural referents unless context clearly indicates otherwise. Similarly, the word "or" is synonymous with "and/or" and is intended to include "and" unless context clearly indicate otherwise. The word "or" means any one member of a particular list and also includes any combination of members of that list.

The term "about" as used herein refers to variation in the numerical quantities that can occur, for example, through typical measuring techniques and equipment, with respect to any quantifiable variable, including, but not limited to, mass, volume, time, distance, angle, wavelength, frequency, voltage, current, and electromagnetic field. Furthermore, there is certain inadvertent error and variation that is likely through differences in the manufacture, source, or purity of the components used to make or carry out the present invention.

The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Numerical adjectives and adverbs (e.g., first, second, etc.), positional adjectives and adverbs (e.g., vertical, horizontal, forward, aft, etc.), nouns referencing a portion of or orientation of an object (e.g., top, bottom, sides, etc.), and the like are referenced according to the views presented. These terms are used only for purposes of description and are not limiting unless these terms are expressly included in the claims. The physical configuration of an object or a combination of objects may change without departing from the scope of the present invention.

The apparatuses, systems, and methods of the present invention may comprise, consist essentially of, or consist of the components of the present invention described herein. The term "consisting essentially of" means that the apparatuses, systems, and methods may include additional components or steps, but only if the additional components or steps do not materially alter the basic and novel characteristics of the claimed apparatuses, systems, and methods.

A "pipe liner" is defined as a material that is used to provide a lining to a pipe. Pipe liners include but are not limited to cured-in-place pipe liners, folded liners, or spray-on liners.

A "cured-in-place pipe liner" is a fabric capable of holding a resinous material.

A "folded liner" is a material constructed of a thermoplastic, such as High Pressure Polyethylene ("HPPE"), High Density Polyethylene ("HDPE"), Medium Density Polyethylene ("MDPE"), Polyvinyl Chloride ("PVC"), and/or modified PVC that is used to provide a lining to pipes.

A "main liner" or "main pipe liner" is defined as a pipe liner for use inside of a main sewer pipe.

A "manhole liner" is defined as a material that is used to provide a lining to a manhole. Manhole liners include but are not limited to cured-in-place manhole liners, spray-on manhole liners, cementitious manhole liners, cast-in-place manhole liners, and resin manhole liners.

A "cured-in-place manhole liner" is a fabric or textile capable of holding a resinous material and conforming to a manhole structure A "spray-on liner" is defined as a material that is used to provide a lining to a manhole or pipe where the material is sprayed onto the walls of the manhole or pipe.

A "cementitious liner" is defined as a cement material that is used to provide a lining to a manhole. Cementitious liners may usually be sprayed, spread, or otherwise placed onto the walls of the manhole.

A "resin liner" is defined as a resinous material that is used to provide a lining to a manhole. Resin liners may be sprayed, spread, or otherwise placed onto the walls of the manhole.

A "service pipe" is defined as a pipe that is lateral to a main pipe.

FIG. 1 is an exemplary sectional view of a pipe system 10. The pipe system 10 includes various components which may comprise an exemplary pipe system. However, it should be appreciated that generally any type of pipe system and/or sewage system such as may be used in infrastructure and municipalities and which may be in need of or have been repair may be considered as part of the disclosure. The pipe system 10 shown in FIG. 1 includes a manhole 12. The manhole 12 includes an opening or access cover 13 to provide access into the manhole 12. The manhole includes walls 14 forming the structure of said manhole 12. Extending from an opening the 17 in a wall 14 of the manhole 12 is a main pipe 16. The main pipe is a term not to be limiting or meaning anything in particular, and instead is included to refer to a specific pipe in the figures. The main pipe includes walls extending a distance from the manhole 12, and may extend from one manhole to another. Generally extending from the main pipe 16 are lateral pipes 18, 19. The lateral pipes 18, 19 may also be referred to as service pipes or user pipes, and extend generally from the main pipe 16 to a building, lot, or other location. For example, the lateral pipes may extend from the main pipe 16 to a dwelling, such as a house, building, place of business, or other structure. The lateral pipes are connected in such a manner that the sewage and other fluids flow from the end location, such as the dwelling, towards the main pipe 16.

Many municipalities include such exemplary pipe systems 10 as shown in FIG. 1, and many of said pipe systems have been in place for an extensive period of time. For example, the pipe systems are generally comprising concrete, vitrified clay, iron, or the like, and the pipe systems can experience wear and tear. Such wear and tear can take many forms, including, while not limited to, freeze and thaw, leakage, subsidence, water erosion, corrosion, cracking, settling, rusting, plant root intrusion or other, or the like. Any penetration or opening in a pipe can allow groundwater and soil to enter, which can block or otherwise overload the pipe system. Such damage to the structure of the systems require repair. While one type of repair is to dig up the area in and around the pipes and to structurally replace the pipes, this is very costly, disruptive and intrusive. For example, a large amount of ground must be displaced in order to access the underground pipes, then the pipes must be torn out and replaced, then the ground replaced and the surface restored. Therefore, many times cured-in-place (CIPP) pipe lining repair is utilized to repair one or more components (pipe or section or pipe) of the pipe system 10.

CIPP pipe repair, such as is disclosed in U.S. Pat. Nos. 9,562,339, 8,550,121, and 9,435,479, which are hereby incorporated by reference in their entirety, includes inverting a resin impregnated liner into a pipe from outside on inside the pipe, such as within an inflatable bladder. For example, when repairing the main pipe 16, the bladder and liner combination may start in the manhole 12 and be inverted into the main pipe 16 via the opening 17. Otherwise, when repairing the lateral pipes 18, 19, access may be started in the manhole or the main pipe. In either sense, little to no ground is as disrupted to provide repair to the pipes. The resin impregnated liner can be cured via an ambient curing agent, a heat source which can be circulated hot water, steam/air mixture, or other (e.g., light, such as ultraviolet light). Currently, steam curing is the most widely used process for curing CIPP. The steam aids in speeding up the curing process of the resin saturated liner in order to provide a new pipe within a pipe that significantly extends the service life of the pipe. However, the resin can include various chemicals, toxins, volatile organic compounds (VOCs), and/or other hazardous elements. The pressurized steam/air can mix with these elements and the resin or within the pipe that can also be contaminated and can create a hazardous mixture. Such a mixture can include, but is not limited to, hazards in the form of chemicals in the air, VOCs in the air, particles in the air, combinations, or the like. Upon completion of the curing, the steam is exhausted from the pipe to an area outside of the pipe, and at such a location, the contaminated or otherwise hazardous steam and chemical mixture can then expose one or more individuals in the area to said hazardous components of the mixture. Therefore, there is a need in order to aid in the repair of a pipe system which reduces or mitigates the exposure to hazardous air mixture during and after the pipe repair process, while still maintaining the structural integrity of the CIPP pipe repair system.

According to aspects of the invention, a filtration system can be utilized with an exhaust of the pipe repair system in order to reduce or otherwise mitigate the hazardous air mixture before it is released from the underground pipe system.

Figure 2:
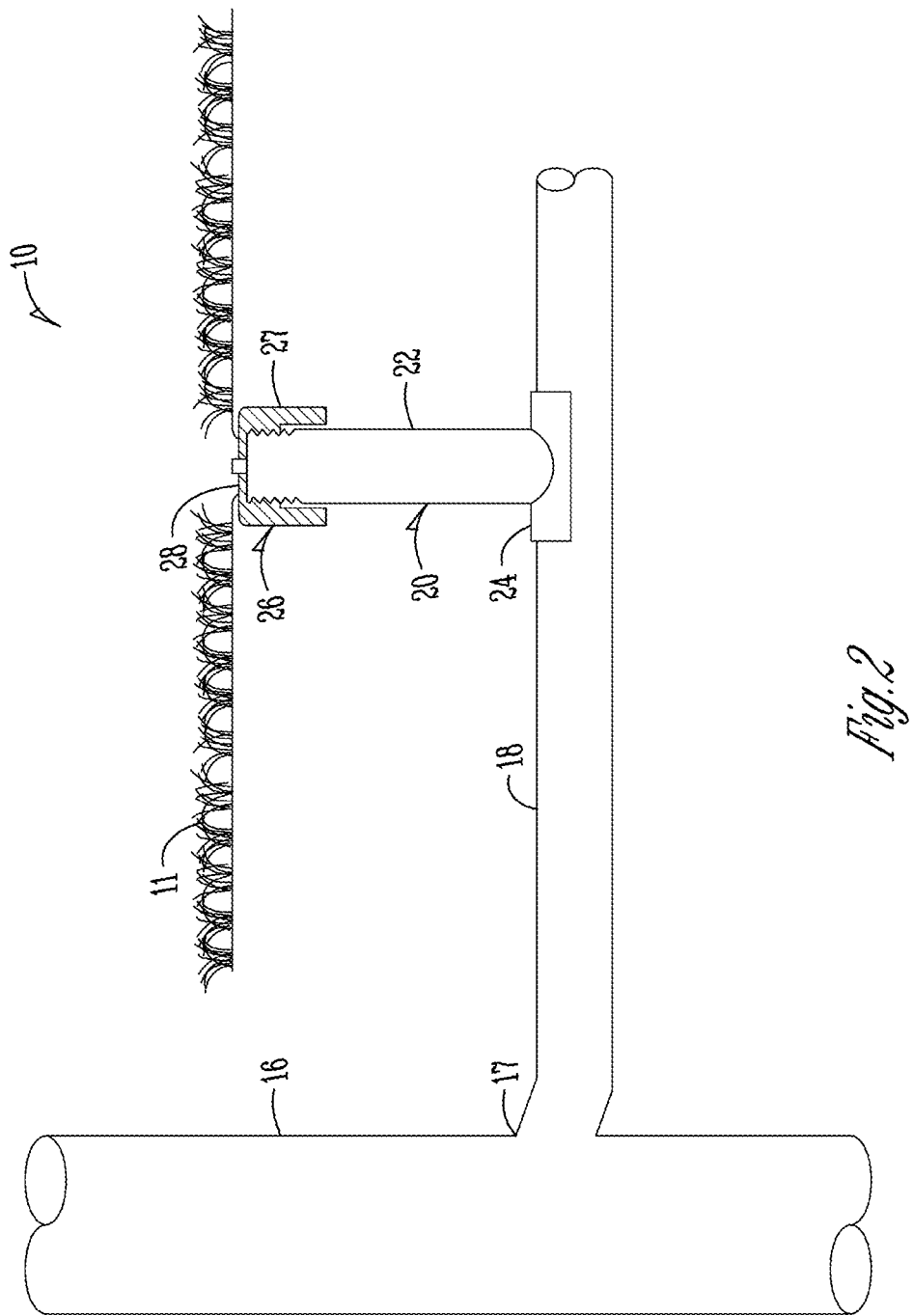
FIG. 2 is a sectional view of an exemplary sewer system showing a main pipe with a lateral pipe extending therefrom, and a clean-out extending from the lateral pipe.
Figure 3:
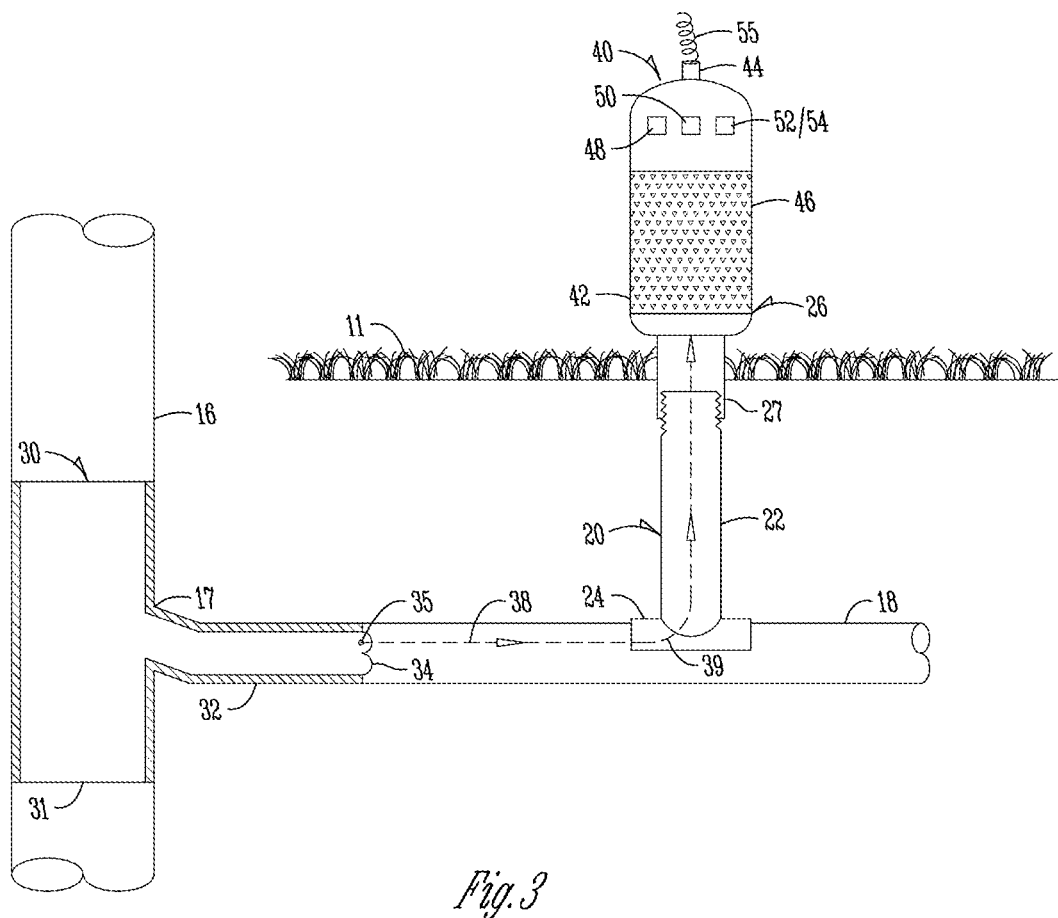
FIG. 3 is a sectional view of the system of FIG. 2 with a liner being positioned from the main and into the lateral pipe, and with a filtration system according to aspects of the invention positioned at the clean-out.
Figure 4:
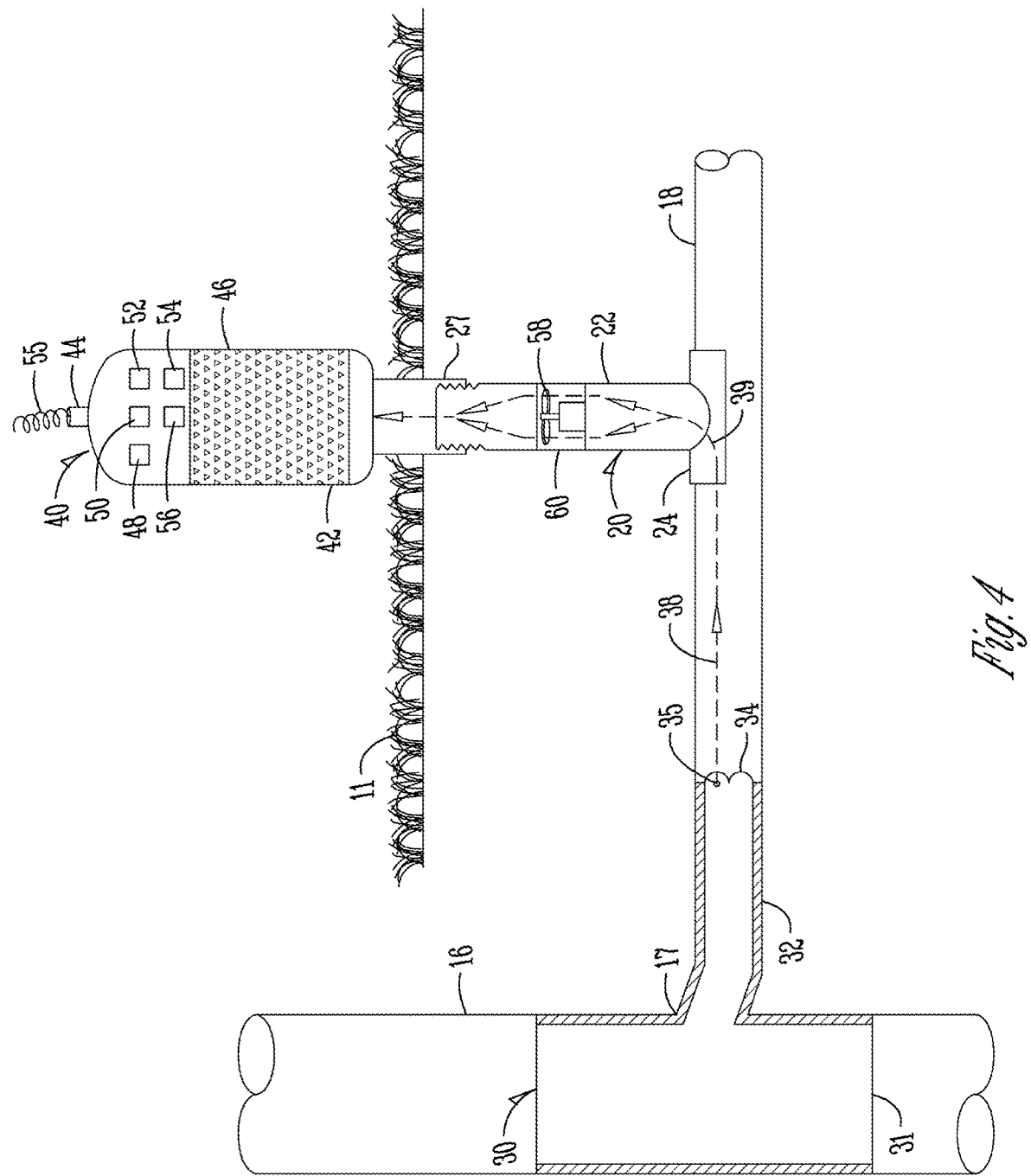
FIG. 4 is a view similar to FIG. 3, but with another filtration system positioned generally at the clean-out.

FIG. 2 is another exemplary view of a pipe system 10 showing the main pipe 16 and the lateral pipe 18 extending from an opening in the main pipe. As disclosed, the lateral pipe extends to a location, such a dwelling. Also shown in FIG. 2 is ground 11 shown by way of grass. This is indicating the location outside of the pipe system 10 to give an idea of exemplary uses of the invention. However, as the pipe system may look different for each municipality and/or location, it should be appreciated that the layout in the figures, and then particular FIGS. 2-4, are for exemplary and illustrative purposes. In addition, as will be understood, any of the aspects disclosed herein should not be limited to the configuration shown in the figure. For example, while at least some of the aspects and/or figures show the repair of a lateral/cleanout pipe, the filtration system as will be provided can be used when repairing any portion, section(s), or otherwise repairing a pipe or pipe system.

As part of the pipe repair using the CIPP repair system, a clean-out 20 is provided to provide access to the lateral pipe 18. A clean-out 20 is utilized by excavating a portion of the ground and providing a clean-out pipe 22 attached to the lateral pipe via a saddle 24. Such a system and method of operation can be found in U.S. Pat. Nos. 9,435,479 and 8,550,121, which are herein incorporated by reference in their entirety. As stated in the references, a length of pipe 22 attached to the saddle 24 is positioned on an exterior of the lateral pipe 18 after access is provided through the ground 11, such as via excavation. A hole is drilled into the lateral pipe 18 to provide access into said lateral pipe 18 through the clean-out pipe 22 and saddle 24. The saddle 24 aids in securing the clean-out pipe 22 to the lateral pipe 18. For example, the clean-out pipe maybe be used to provide access to the lateral pipe for inspecting, for cleaning out any roots, sewage, dirt or other debris in the pipe, and they also provide a location for exhaust of the pressurized steam/air from within the CIPP to be expelled safely. The clean-out can provide numerous other advantages including inserting an inflatable plug to temporarily take the pipe out of service.

According to aspects of the invention, a filtration device can be connected to the clean-out 20 in order to filter any emissions from the exhaust that is allowed to pass from the interior of the lateral pipe, through the clean-out pipe 22, and exterior of the ground 11. In order to do so, a fitting 26 can be placed at a distal end of the clean-out pipe 22. The fitting 26 can include a female attachment member 27 as well as a cap or plug 28 that attached thereto. For example, the female attachment 27 can include internal threads or connection members and the cap or plug 28 can include external threading or connection members which correspond to the threads of the female attachment in order to connect thereto. The connection may be a fluid tight or semi fluid tight manner as well.

As will be understood, the term "fitting" can be used to cover generally any apparatus, system, method, or otherwise to position, attach, connect, or otherwise associate a filter at a portion of a pipe to filter the air, curing elements, and/or other mixtures involved with the pipe repair to reduce the particles, VOCs, or other impurities in the mixture. As noted, the fitting could be by way of threading, but could also cover, adhesives, rope, elastic, mechanical connection, placing, or generally any other manner.

FIG. 3 is a view of the pipe system 10 in showing the CIPP repair along with the filtration system 40 according to aspects of the invention. As stated, the CIPP pipe repair includes a pipe liner 30. The pipe liner may include a T-liner 31. The T-liner 31 includes a portion which is positioned in the main pipe 16 and also includes a lateral member extending from a main portion. The lateral portion of the liner 32 is inverted into the lateral pipe 18 by way of an inflatable bladder 34. For example, the bladder and liner may be configured as a liner/bladder assembly wherein the liner is positioned within the bladder. The assembly is inverted into the lateral pipe, the liner becomes positioned on the exterior of the inflated inverting bladder that presses the liner tight against the host pipe. The liner 32 is soaked or otherwise impregnated with a liquid resinous material that is capable of hardening. Such a resin material is hardened to form the new interior of the main and/or lateral pipes. Upon hardening, and due to the expansion of the bladder 34, the thickness of the resulting liner and resin will be generally negligible with respect to the previous pipe, but which will provide a structural integrity greater than that of the previously deteriorating pipe.

Furthermore, compressed air is generally used to inflate/invert the bladder 34. Once the liner inverted in the pipe, steam is mixed with the compressed air. The steam aids in speeding the curing time of the resin saturated in the liner 32. Thus, the steam acts as a curing agent. However, the steam needs to continuously pass through the resin saturated liner and be exhausted therefrom and can be done so via an exhaust port 35 in the bladder, such as at or near the terminal end expanded bladder face. The pressurized steam/air interacts with the resin, the bladder, as well as any other materials in the main and/or lateral pipes. Such material can be hazardous or even cancerous, such as in the form of VOCs. The contaminated steam 39 needs to be exhausted from the pipe system 10. The mixed steam/air combination can be directed via the clean-out 20 and towards an outlet or exhaust 44. Prior to exhaust, the steam can be directed through a filtration system 40, which can include a shield 42. The filtration system 40 can be positioned such that any air, steam, and/or combination of the air, steam, and the other material is forced to pass through the filtration system 40 before reaching an exhaust outlet 44 in order to remove chemicals, VOC's, particles, fumes, and/or other hazardous materials from the steam and/or air before exhausting the same such that clean air 55 exhausts from the pipe.

The filtration system 40 includes a fitting 42 and an exhaust 44. Generally, within the fitting 42 can be a filter for filtering the air and/or steam passed therethrough. Such a filter can take many forms, including a carbon filter. A carbon filter uses a bed of activated carbon to remove contaminants and impurities, using chemical adsorption. Each particle, or granule, of carbon provides a large surface area, or pore structure, allowing contaminants the maximum possible exposure to the active sites within the filter media. Activated carbon works via a process called adsorption, whereby pollutant molecules in the fluid to be treated are trapped inside the pore structure of the carbon substrate.

Carbon filters are known, in particular charcoal carbon filters are known to remove chlorine, and other particles including VOCs. Still other filters include wood base activated carbon filters and coconut base activated carbon filters can be used. Such filters provide filtering of the air and/or steam mixtures to remove contaminants from the air to provide a clean exhaust therefrom. However, it should be appreciated that additional types of filters could and can be used in the filtration system 40. After the air is moved through the filter 46, it can be exhausted from the fitting 42 in a safe manner.

Additional components maybe connected to the fitting or end cap or plug to provide information therefrom and thereafter. Such components may take the form of sensors or sensing means. For example, a temperature sensor 48, pressure sensor 50, chemicals sensor 52, air quality sensor 54 and/or flow meter 56 may be included as part of the filtration system 40. Any of the sensors may be included to provide additional information related to the pipe repair and/or exhaust through the filtration system 40. The temperature sensor 48 can be a thermometer, thermistor, thermocouple, or the like and can be used to provide temperature readings of the air being filtered and exhausted as clean air 55. A pressure sensor 50 can detect the pressure of the air/steam mixture moving through the filtration system and/or in the pipe and can be indicative of the amount of pressure being used to repair the pipe via the CIPP repair system and can also be used to determine when the air has been exhausted such that it is safe to remove the filtration system. This can occur as a result of a drop of pressure through the filtration system 40. The chemical sensor 52 can be used to confirm that no or few emissions in the form of hazardous air is being exhausted. In use with the air quality sensor 54, the chemical sensor can detect, such as by parts per million, the number of hazardous contaminants in the air passing through the filtration system to provide feedback on the clean air 55 being exhausted therefrom. As will be understood, the sensor can be connected to an alarm, readout, or network to provide feedback such that the system can be altered if a reading outside an acceptable threshold is determined. Still further, the flow meter 56 can provide information, such as the speed of the air passing through the filter. This can be indicative of a buildup on the filter if the flow has been reduced such that a filter may need to be replaced or otherwise cleaned. Still other sensors are to be acceptable and considered as part of the invention such that they will provide feedback to the system.

FIG. 4 is another exemplary embodiment of the repair of a pipe system 10 using the CIPP repair system 30. Furthermore, the filtration system 40 is included and attached to the clean-out 20 at the cap or plug fitting. However, as shown in FIG. 4, one or more pressure sources is included with the filtration system 40 in the form of a blower fan 58 and/or a vacuum 60 in order to aid in the movement of the contaminated air 39 towards and through the filtration system 40 such that clean air 55 is exhausted therefrom. A blower fan 58 provides a positive pressure to move air in a positive manner/direction such as downstream of the filtration system 40. The downstream manner will aid in pushing or otherwise positively directing the contaminated air 39 through the clean-out 20 and the filtration system 40 including the filter 46. A blower fan can take many forms including a brushless DC fan, a plurality of fans, or other fan mechanism in order to move the air in a positive manner.

A vacuum source can also be used to draw the air 39 from the bladder exhaust 35 and towards, into, and from the filtration system 40. For example, a vacuum system could be positioned generally upstream of the filter to draw the air combination through the one or more filters of the filtration system 40 before exhausting at the exhaust 44 in a clean air manner 55. A vacuum could also be positioned in the clean-out to begin drawing the air from the lateral pipe into the clean-out pipe and towards the filtration system 40. Still further, a blower fan and vacuum could both be used in order to move the air towards the filtration and from the filtration system in order to speed the process up and to ensure efficient manner of cleaning the air before exhaust.

The location of the fan 58 and/or vacuum 60 can be anywhere in the system in order to aid in mitigating exposure to the public, such as to a building or residence. For example, the pressure source (fan and/or vacuum) can be positioned at or near the filter 46 and can be used during CIPP lateral rehabilitation and/or during CIPP rehabilitation of the main pipe 16. During mainline CIPP, the resin side of the liner tube is in contact with the host pipe meaning the resin is facing the open lateral pipe. VOC's emitting from the resin can migrate up the lateral pipe and enter buildings through pipe defects or most commonly, dry fixture traps. The filters attached to a cleanout outfitted with an exhaust fan creates a negative pressure that draws the emissions up through the filter. Still further, when a cap 28 is used with the filtration system, the cap can quickly and easily be removed providing full cleanout pipe diameter access to the pipe for the purpose of inserting inflatable sewer plugs, inspecting the pipe using CCTV camera and other equipment and tools. The insertion of an inflatable plug blocks the pipe and ensures that the homeowner is protected during CIPP curing. Even after the CIPP is cured and the main/lateral pipe connection is reinstated for use, there remains emissions in the main pipe and up into the lateral pipes. For this reason, post curing, the lateral plugs can be removed, and the filters should be left in-place with the fan running on each filter so to continue exchange air in the sewer pipe system to purify the pipe from harmful emissions.

It should also be appreciated that while one filter has been shown and described with respect to the filtration system 40, generally any number of filters could be utilized to aid and increase the efficiency of the cleaning of the air mixture 39. For example, the filtration could include multiple stages of filters wherein a first filter removes some components and a second, finer filter could be positioned upstream of the first filter in order to further review this contaminates and so on and so on until the air reaches the exhaust point. Therefore, an N number of filters could be utilized in order to increase the efficiency and cleanliness of the air before exhaust of the air to outside of the pipe system. Furthermore, different types of filters beyond carbon filters could be utilized as well. For example, a first filter can be a mechanical filter such as a HEPA filter that traps particles, a gas phase filter, and/or ozone generator, and the second filter could be the carbon filter to further remove the particulate and other harmful chemicals from the air before it is released via the exhaust.

In addition, a downstream manhole (see, e.g., downstream manhole 15 in FIG. 8) could include a point of filtration as well. This is a location wherein the mainline CIPP liner is exhausting steam. A larger filtration system could be used, such as in the form of a truck or trailer instead of the fitting at the ends of the lateral pipes. The filtration could take the form of any disclosed, such as carbon filters or ozone filtration/purification.

Still further, the filtration at the downstream manhole could be used for visual purposes. For example, steam is often used to aid in the curing of the liner components with CIPP. The steam needs to be exhausted from the pipe system and can be exhausted at said downstream manhole. The visual implications of steam rushing out of a manhole, which is generally in the middle of a street or in other public viewing, can be jarring. Seeing the steam can be a sign on unknown, potential issues. Therefore, the filtration system at the downstream manhole can include a condensation system or aspect, which can condense the steam into tiny droplets of water, which then can be released. This will reduce possibility of public fear from the steam plume discharged into the open air, in addition to filtering any potentially dangerous and/or hazardous elements into the ambient location.

Figure 5:
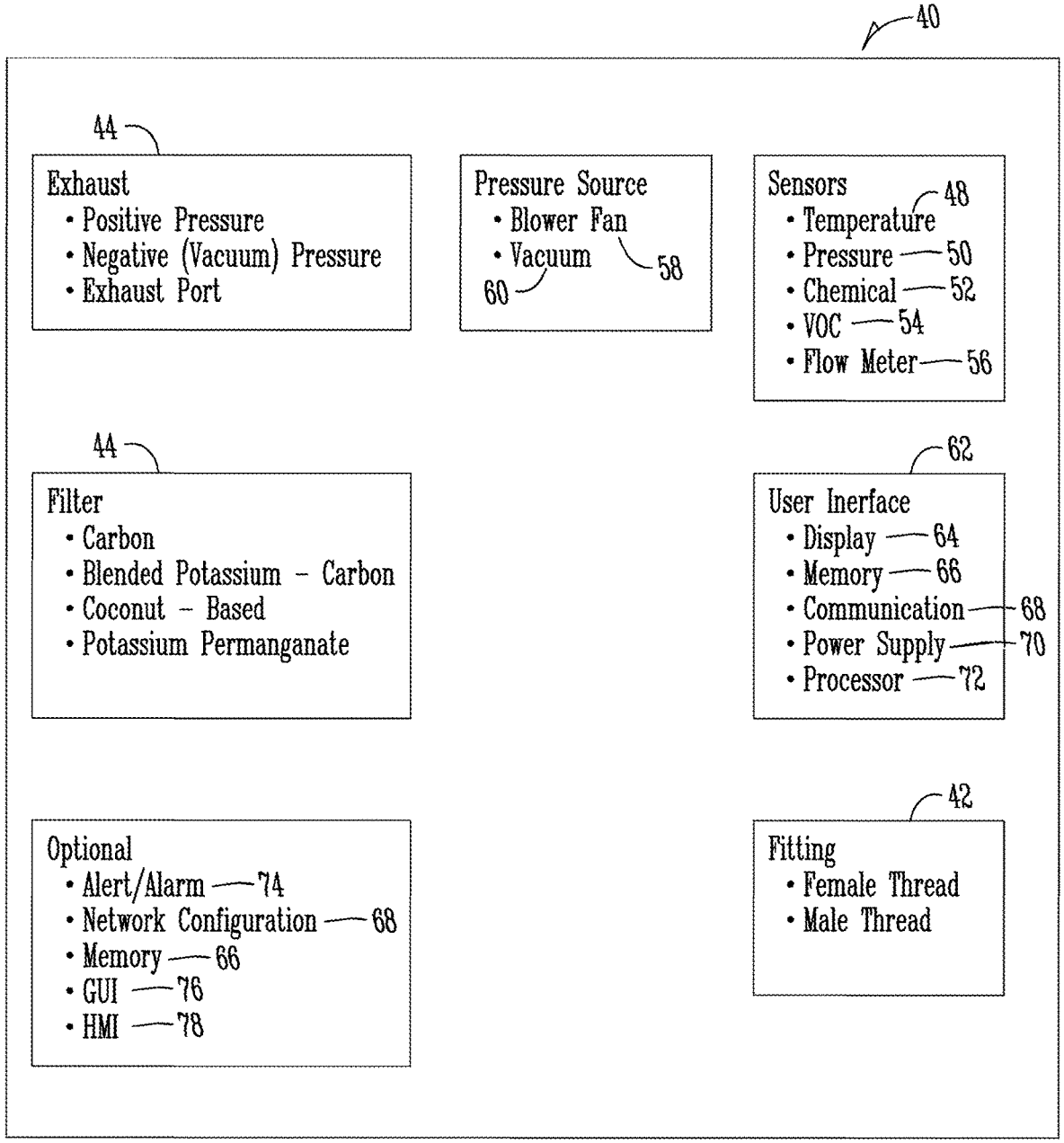
FIG. 5 is block diagram showing exemplary and/or optional components of a filtration system according to aspects of the invention.

FIG. 5 is a diagram and/or schematic showing additional aspects of the filtration system 40 and including components and optional components of the system. It should be appreciated that any of the components shown and described with respect to FIG. 5 could be included in any of the embodiments and/or exemplary embodiments as shown and described in the disclosure and are not to be separated or considered separate.

For example, the filtration system, according to any of the embodiments disclosed in the present specification, can include an exhaust aid. The exhaust aid can comprise one or more or an exhaust port, a positive pressure source, and/or a negative pressure source. A positive pressure source could be in the form of a fan, blower fan, air pump, or the like, and a negative pressure source could be in the form of a vacuum. However, at a minimum, an exhaust port is needed to provide an exhaust for the air exiting the filtration system whereby aspects of the exhaust can be sensed and monitored.

As noted, a filter or filters can take many forms and not be limited to a single form. Such filters can be mechanical filters that use screens to trap particles, hybrid filters utilizing mechanical and electrostatic components, gas phase filters, ozone generators, carbon-based filters, blended potassium carbon filters, coconut-based filters, and potassium-based filters. In addition, blended potassium-carbon filters or potassium permanganate filters can be utilized for removing VOCs from the air. Furthermore, any combination of any of the filters, including utilizing two the same type of filters can be utilized in order to reduce and/or remove harmful and/or hazardous components mixed with the air.

As further mentioned, sensors can be utilized as part of the filtration system to provide feedback and/or other data and information to the filtration system. Sensors can include, but are limited to a temperature sensor 48, a pressure sensor 50, a chemical sensor 52, an air quality and/or via C-sensor 54, and/or a flow meter 56. Still additional sensors are contemplated and can include light sensors, particle detectors, radon detectors, or other gas or air quality sensors to determine an aspect of the flow through the filtration system 40. Furthermore, as noted, the temperature sensor can take the form of thermometers, thermistors, thermocouples, or other temperature detecting means. The pressure sensor 10 take any form of sensor that is able to detect a pressure within the filtration or pipe system. A chemical sensor 10 take the form of a sensor detecting one or more chemicals, gasses, fluids, or other particulates that had mixed with the air. Air quality or VOC detectors can further aid in detecting specific types of particles in the air. Finally, the flow meters can detect the velocity of flow through the pipe and/or filtration system to determine the efficiency of the filtration system and also determine if there are any blockages or otherwise in the system that need addressed.

The sensors sense one or more characteristics of an object and can include, for example, accelerometers, position sensors, pressure sensors (including weight sensors), or fluid level sensors among many others. The accelerometers can sense acceleration of an object in a variety of directions (e.g., an x-direction, a y-direction, etc.). The position sensors can sense the position of one or more components of an object. For example, the position sensors can sense the position of an object relative to another fixed object such as a wall. Pressure sensors can sense the pressure of a gas or a liquid or even the weight of an object. The fluid level sensors can sense a measurement of fluid contained in a container or the depth of a fluid in its natural form such as water in a river or a lake. Fewer or more sensors can be provided as desired. For example, a rotational sensor can be used to detect speed(s) of object(s), a photodetector can be used to detect light or other electromagnetic radiation, a distance sensor can be used to detect the distance an object has traveled, a timer can be used for detecting a length of time an object has been used and/or the length of time any component has been used, and a temperature sensor can be used to detect the temperature of an object or fluid.

Still further, in order to provide an open and/or closed loop system, feedback can be generated via any of the sensors and provided to a user and/or operator. In a closed system, the feedback can be looped such that any of the sensors can be connected to a processor 72 that determines if the detected or sensed characteristics of the air flowing through the filtration system is within an acceptable range. If it is determined that any of the sensed characteristics are outside the range, action can be taking to alert a user or otherwise change the flow rate or filter in the system in order to increase or decrease the flow and filtration therethrough.

However, the system will generally be an open loop system in which a user interface 62 is provided to provide feedback of the sensors and filtration system to a user via a display 64. The display can include a screen or other user interface. A user interface is how the user interacts with a machine. The user interface can be a digital interface, a command-line interface, a graphical user interface ("GUI") or any other way a user can interact with a machine. For example, the user interface ("UI") can include a combination of digital and analog input and/or output devices or any other type of UI input/output device required to achieve a desired level of control and monitoring for a device. Examples of input and/or output devices include computer mice, keyboards, touchscreens, knobs, dials, switches, buttons, etc. Input(s) received from the UI can then be sent to a microcontroller to control operational aspects of a device.

The user interface module can include a display, which can act as an input and/or output device. More particularly, the display can be a liquid crystal display ("LCD"), a light-emitting diode ("LED") display, an organic LED ("OLED") display, an electroluminescent display ("ELD"), a surface-conduction electron emitter display ("SED"), a field-emission display ("FED"), a thin-film transistor ("TFT") LCD, a bistable cholesteric reflective display (i.e., e-paper), etc. The user interface also can be configured with a microcontroller to display conditions or data associated with the main device in real-time or substantially real-time.

In some embodiments, a device could include one or more communications ports such as Ethernet, serial advanced technology attachment ("SATA"), universal serial bus ("USB"), or integrated drive electronics ("IDE"), for transferring, receiving, or storing data.

The display can be local or remote for example, a local display can be positioned on or at or near the filtration system to provide and display information of one or more of the sensors. In addition, the display 64 can be remote and can connected via network 68 in order to provide remote information. For example, the display can be any of a phone, tablet, handheld, computer, server, or the like and can be connected via a network including but not limited to Bluetooth, WIFI, internet, cellular data, or the like in that the filtration system passes the sensed information from the filtration system to the display 64 to provide feedback thereat. In some embodiments, the network is, by way of example only, a wide area network ("WAN") such as a TCP/IP based network or a cellular network, a local area network ("LAN"), a neighborhood area network ("NAN"), a home area network ("HAN"), or a personal area network ("PAN") employing any of a variety of communications protocols, such as Wi-Fi, Bluetooth, ZigBee, near field communication ("NFC"), etc., although other types of networks are possible and are contemplated herein. The network typically allows communication between the communications module and the central location during moments of low-quality connections. Communications through the network can be protected using one or more encryption techniques, such as those techniques provided in the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

The display can also include a processing means 72 and/or memory 66. The processor can be any processing means including controller or microcontroller capable of operating and receiving and passing information. Examples of such intelligent control units may be central processing units alone or in tablets, telephones, handheld devices, laptops, user displays, or generally any other computing device capable of allowing input, providing options, and showing output of electronic functions. A central processing unit (CPU), also called a central processor or main processor, is the electronic circuitry within a computer that carries out the instructions of a computer program by performing the basic arithmetic, logic, controlling, and input/output (I/O) operations specified by the instructions. Still further examples include a microprocessor, a microcontroller, or another suitable programmable device and a memory. The controller also can include other components and can be implemented partially or entirely on a semiconductor (e.g., a field-programmable gate array ("FPGA")) chip, such as a chip developed through a register transfer level ("RTL") design process.

The memory can store information related to the filtration system and can also include a time stamp to provide information for a later review and analysis. The memory includes, in some embodiments, a program storage area and a data storage area. The program storage area and the data storage area can include combinations of different types of memory, such as read-only memory ("ROM", an example of non-volatile memory, meaning it does not lose data when it is not connected to a power source) or random access memory ("RAM", an example of volatile memory, meaning it will lose its data when not connected to a power source). Some additional examples of volatile memory include static RAM ("SRAM"), dynamic RAM ("DRAM"), synchronous DRAM ("SDRAM"), etc. Additional examples of non-volatile memory include electrically erasable programmable read only memory ("EEPROM"), flash memory, a hard disk, an SD card, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

A power supply can be provided to the user interface and/or display in order to provide power thereto. The power supply outputs a particular voltage to a device or component or components of a device. The power supply could be a DC power supply (e.g., a battery), an AC power supply, a linear regulator, etc. The power supply can be configured with a microcontroller to receive power from other grid-independent power sources, such as a generator or solar panel.

With respect to batteries, a dry cell battery [or a wet cell battery] may be used. Additionally, the battery may be rechargeable, such as a lead-acid battery, a low self-discharge nickel metal hydride battery (LSD-NiMH) battery, a nickel-cadmium battery (NiCd), a lithium-ion battery, or a lithium-ion polymer (LiPo) battery. Careful attention should be taken if using a lithium-ion battery or a LiPo battery to avoid the risk of unexpected ignition from the heat generated by the battery. While such incidents are rare, they can be minimized via appropriate design, installation, procedures and layers of safeguards such that the risk is acceptable.

The power supply could also be driven by a power generating system, such as a dynamo using a commutator or through electromagnetic induction. Electromagnetic induction eliminates the need for batteries or dynamo systems but requires a magnet to be placed on a moving component of the system.

The power supply may also include an emergency stop feature, also known as a "kill switch," to shut off the machinery in an emergency or any other safety mechanisms known to prevent injury to users of the machine. The emergency stop feature or other safety mechanisms may need user input or may use automatic sensors to detect and determine when to take a specific course of action for safety purposes.

Optional components of the filtration are shown in FIG. 5 as well. Such optional components should be considered part of the invention but are also to be appreciated to not be required in all embodiments and/or aspects of the invention. For example, an alert or alarm 74 can be included with the filtration system 40. Such an alert or alarm can be audio-based, visual-based, textile-based, or a combination thereof. Such an alarm can provide feedback in the form of a sensed characteristic being outside and acceptable or preset threshold. The alarm can alert one to check the system to see if changes are to be made thereto or to let them know to take action in order to provide safety to the operators of the filtration system. Network configuration or protocol 68 can be included to communicate information from the filtration system to one or more devices, displays, interfaces, or the like. Memory can be located at the filtration system or remote and can provide a location to store filter information including time and date information so that the analysis can be studied, and data reviewed for best practices and to further improve the efficiency of the system. A graphic user interface 76 and a human machine interface 78 can also be provided. A graphic user interface provides for more than just letters and numbers and actually provides colors, pictures, and/or video to determine aspects of the filtration system. A human machine interface 78 allows for a user to make changes via a user interface to the system, such as by changing an aspect of the pressure source to increase or decrease the air flow or otherwise change an aspect of a filtration mechanism.

As disclosed, the filtration system could be used with the pipe repair of any portion of a pipe, pipe, or pipe system. For example, at times, it is the manhole that is being repaired. The main pipe extending from the manhole may be repaired, either in full, from manhole to manhole, or a portion thereof. The lateral pipe could be repaired with the main pipe, or separate thereof. Still further, some pipe systems are repaired all at once. The filtration system as shown and/or described could be used with any of such repairs in order to reduce the potentially dangerous combination of air and impurities, particles, VOCs, or other in the air that is released from the pipe repair.

It should be appreciated that additional components are to be contemplated, even though not explicitly disclosed. For example, additional type of sensing mechanisms which may aid in determining the quality of the filtration system and the quality of the clean air exhausting therefrom may be included to provide even further information and safety for operation thereof. Additional feedback mechanisms may also be provided in order to optimize and operate the system. For example, the feedback could be in the form of an operating manual built into a display such that easy changing of any of the components, such as filters or sensing mechanisms can be provided without having a physical copy thereof. Other instructional information can be provided in a user interface or display to provide an operator instruction for operation of the filtration system. Still other information may be provided.

Figure 6:
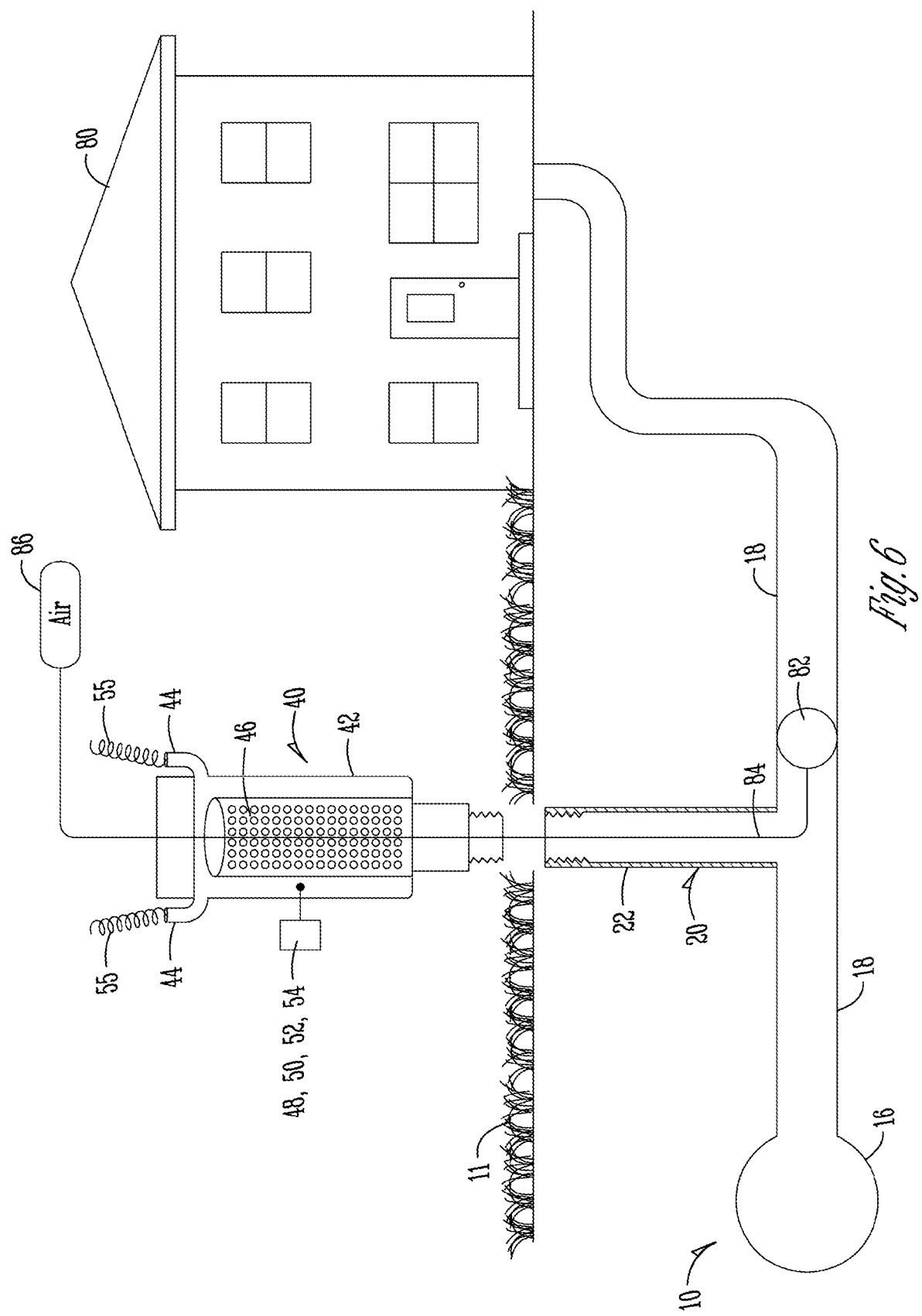
FIG. 6 is a schematic view of a pipe system being repaired and a filtration system used therewith.

FIG. 6 shows another depiction of a pipe system 10 including aspects and/or embodiments of the invention. As shown in FIG. 6, the pipe system 10 includes a mainline pipe 16 with a lateral pipe 18 extending therefrom. The lateral pipe 18 extends to the house 80. However, this may be another structure as well. A cleanout 20 with pipe 22 extends from the lateral pipe 18 to a location outside of the pipe system 10. As noted, and as is known, the cleanout pipe 22 can provide access to the pipe system 10, such as to repair one or more sections or portions of the pipes of the system. For example, it may be the mainline pipe 16 that is being repaired with CIPP.

To mitigate fumes, vapors, and/or other potentially harmful or perceivably harmful emissions to move to the house 80, a plug 82 is introduced in the lateral pipe 18. The plug 82 can be an inflatable member that is inflated to attempt to block the emissions from passing past the plug 82. As shown in FIG. 6, an airline 84 and air source 86 are connected to the plug to inflate the plug 82 after it has been positioned in the pipe 18.

After the plug 82 is inflated, the main and/or lateral can be repaired as noted, such as via the CIPP process. In addition, the figure also shows the use of the fitting 42 with the exhaust 44, filter 46, and sensor, which may be any of the sensors as has been shown and/or described herein. For example, the system as shown and/or described in FIG. 3 could be used with the system of FIG. 6.

Figure 7:
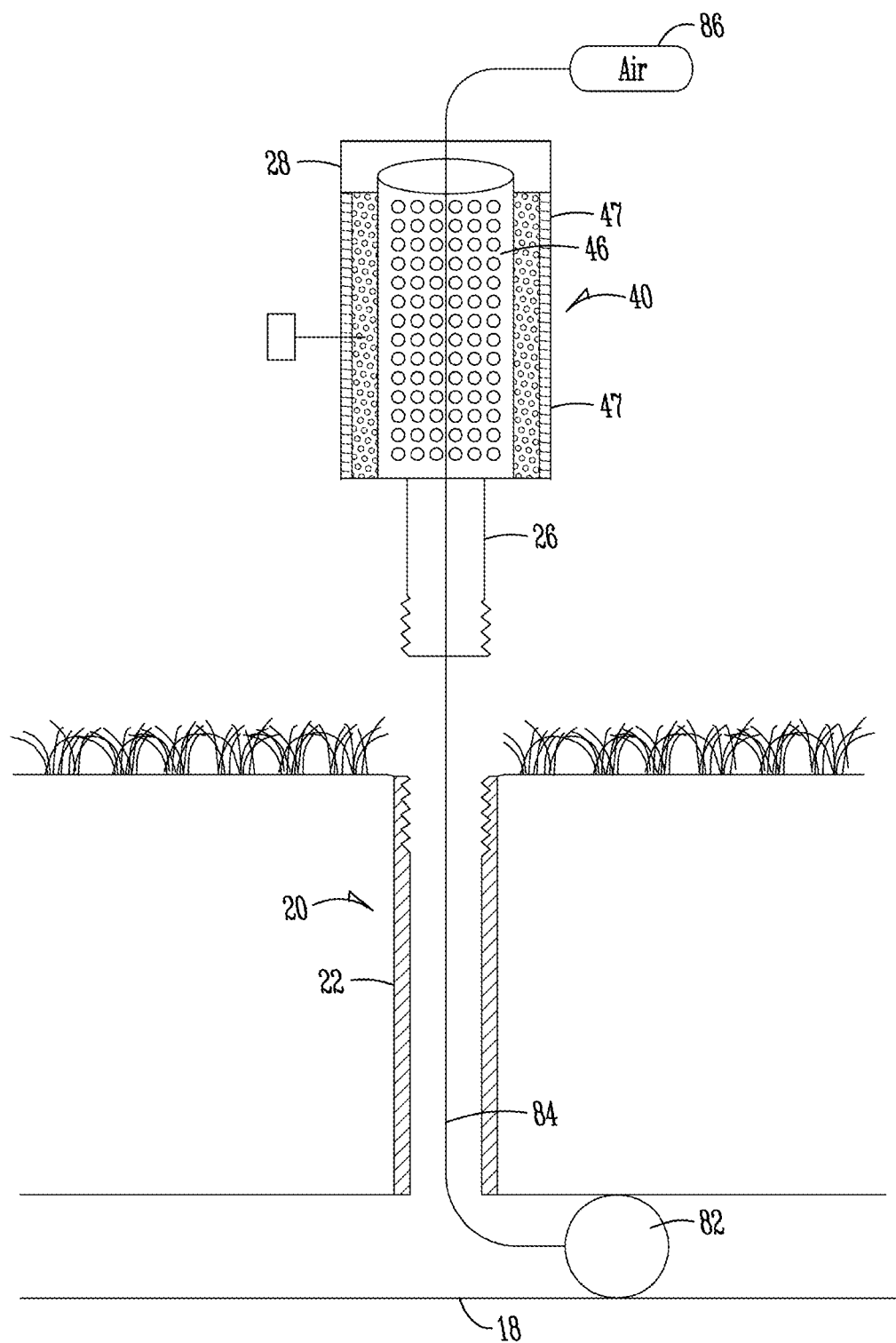
FIG. 7 is another schematic of a portion of a pipe system with filtration system.

The system 40 of FIG. 6 is shown in greater detail in FIG. 7. As shown, the system includes a fitting 26 with a cap 28. The fitting 42 may include threaded portions as well, such as via an adapter. The fitting 42 includes a filter 46, which may be a carbon filter or other type of filter as shown and/or described. A fabric filter and/or secondary filter 47 may also be used to aid in filtering the emissions of the system. As shown, the air line 84 connected to the plug 82 and air source 86 extends through a sealed hole in the cap 28. The system further includes at least one emissions sensor, which may comprise a temperature sensor, pressure sensor, chemical sensor, air quality sensor, or any other sensor as may be used with the emissions system and has been shown and/or described. The figure also shows exhaust from the system, which is in the form of clean air 55 after it has passed through the filter(s) of the system 40.

Figure 8:
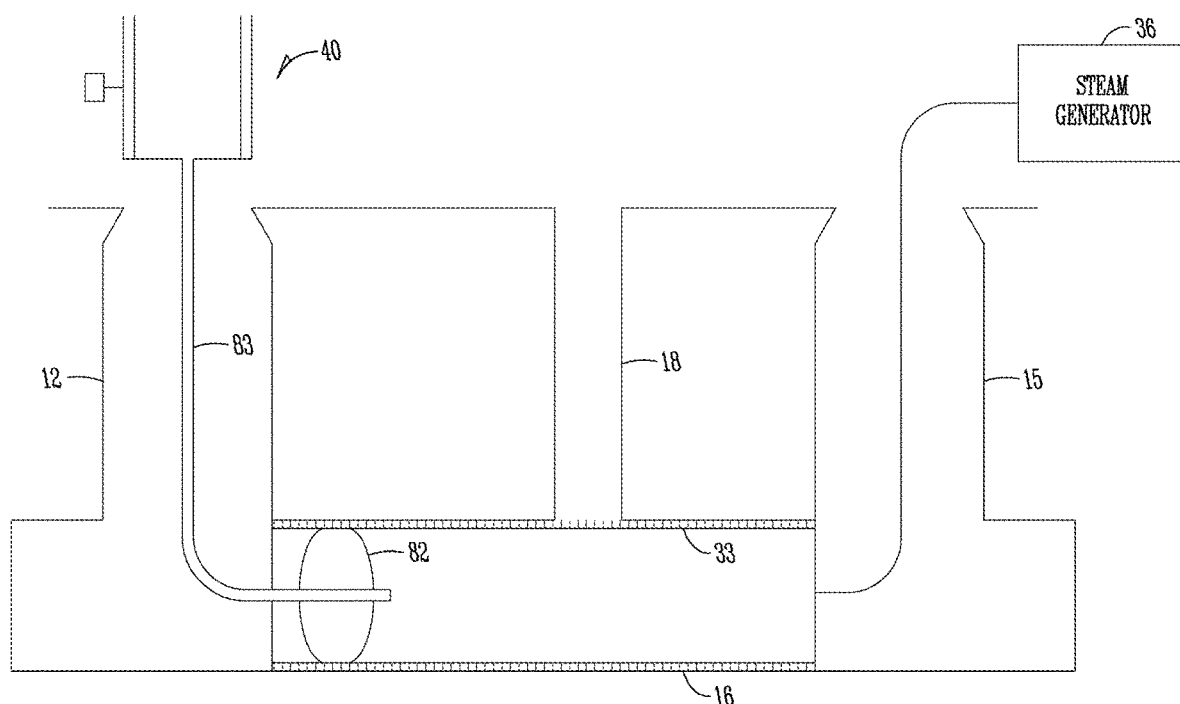
FIG. 8 is a depiction of a portion of the main pipe being repaired using CIPP and a filtration system used therewith.

FIG. 8 is a depiction of another pipe system being repaired. As shown, there is a manhole 12, main pipe 16, lateral pipe 18, and a downstream manhole 15. In FIG. 8, it is the main pipe or mainline pipe 16 being repaired via the CIPP system and/or process. As shown, a mainline liner 33 that includes the curable resin is positioned in the main pipe 16 to repair a portion or portions of the wall of the pipe. As noted herein, the filtration system 40 could be used during the repair process to filter emissions from the repair of the CIPP liner in the main pipe 16.

Still further, it is envisioned and to be understood that additional filtration systems 40 could be added and used in conjunction with one another. For example, for the depiction shown in FIG. 8, it is possible that the contaminated air could travel through the lateral pipe 18. To mitigate the exposure of the contaminated air/steam, a second filtration system could be positioned to direct the contaminated air therethrough, which would further mitigate the possible exposure of the contaminated air at the end of the lateral pipe. The same or similar filtration system as has been shown and/or described could be used, such as with an air source to aid in directing the contaminated air through the system. In pipe systems where multiple laterals extend, or where other configurations of pipes are included, even additional filtration system could be included for each pipe section, such as to receive any contaminated air/steam and to filter the same before possible exposure to a residence, building, and/or ambient environment.

As shown in the figure, a plug 82 is included at one end of the main line liner 33 during the introduction of steam, such as via the steam generator 36, to aid in curing the resin. A conduit 83 is shown to pass through a portion of the plug and at the end of the conduit is a version of the filtration system 40, which includes at least one filter and at least one sensor to filter and monitor the emissions exhausted from the process.

However, even after the CIPP is cured and the pipe is reinstated for use, there remains emissions in the main pipe and up into the lateral pipes. Thus, it may be beneficial to include a fan (either blower fan or vacuum fan) with or in combination with the filtration system. The fan can be used, as shown and described previously herein, such as after the plugs are removed to continue to direct any air from within the pipe system to and through the filtration system 40.

Furthermore, as included herein, the filtration system 40, such as at a cleanout or a manhole (e.g., downstream manhole) may include additional features/functionality. The sensor may be a VOC sensor or other type of sensor provided. In addition, as disclosed, the sensor may be connected wirelessly to a processor, such as via Bluetooth. An emissions report can be sent to review, confirm, and/or change any portion of the filtration system and/or CIPP process.

Figure 9:
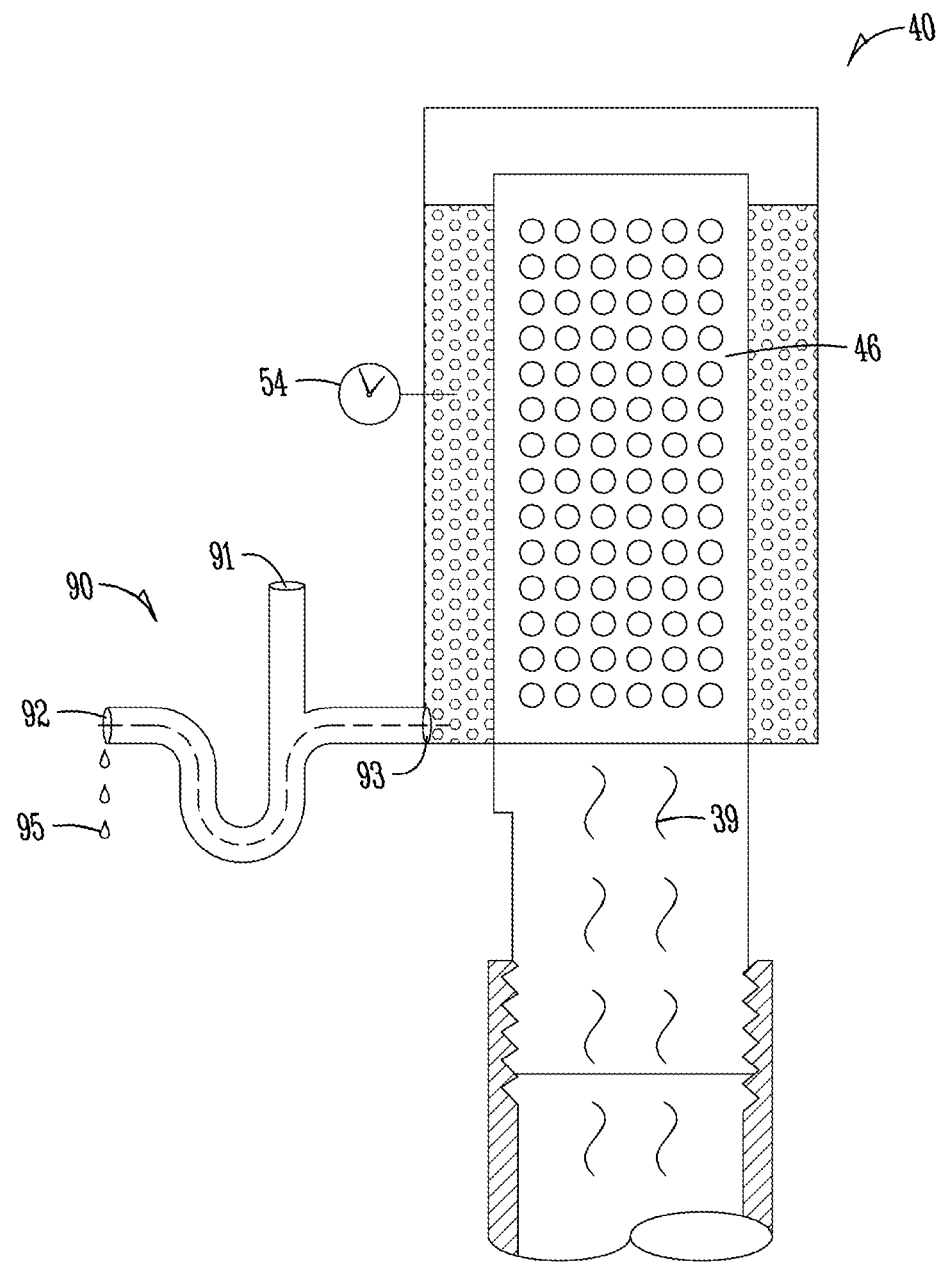
FIG. 9 is a section view of a filtration system according to additional aspects and/or embodiments.

In addition, as shown in FIG. 9, a condensation system 90 may be included at or near the filtration system 40. The condensation system 90 is used to receive steam at the steam inlet 93, such as after the steam has passed through one or more filters. A water bath, radiator or other means to cool and convert the steam to condensate, which will reduce the plumage of steam that is exhausted from the pipe system during repair. The water or other fluid can be introduced to the condensation system 90 via the inlet 91, where it can mix with the steam. The mixture will cool the steam to convert the steam to water droplets 95, which can be released via the exit 92 of the system 90. This provides advantages to the appearance/aesthetics of the system, such as to mitigate fear of the unknown from seeing a plume of steam arising from a pipe system.

The condensation system 90 can be part of the filtration system 40, or can be positioned separately, but adjacently thereto. This would allow the pressurized steam, which may contain VOC's or other potentially harmful emissions, to be filtered prior to condensing. This would provide the added benefit of public health in addition to the aesthetics from reducing the plumage of steam.

Therefore, a filtration system for use with the CIPP repair system has been shown and described. The filtration system can include any of the components disclosed in any of the embodiments disclosed to provide numerous combinations, which are all to be considered part of a single invention of systems, methods, and/or apparatuses for filtering exhaust of a repair pipe.

The proper order of operations is a detailed discussion of how many quality procedures can be implemented to install a mainline liner and/or lateral liner following a step by step process resulting in a consistent quality CIPP installation. It has been common practice to first rehabilitate a mainline and then rehabilitate the service pipes. Cleanouts 20 are typically installed by the lateral lining contractor and therefore cleanouts 20 are generally not in-place when the mainline CIPP liner is installed. This has led to public health concerns ranging from toilets blown up from sewer jetting, to homeowners complaining of paint smell and a headache. This has happened in cities everywhere and when it does happen, it causes great concern for municipal utility owners and contractors alike.

The order of operations controls the quality of the CIPP. There are significant advantages by simply changing the order of operations and installing service cleanouts on all service pipes and plugging the pipe to ensure system flows are stopped before lining the main pipe. The order of operations provides for a higher quality CIPP and ensures residents are protected from unpleasant odors that could be harmful.

The contractor has good access to the service pipe that feeds the main pipe when the cleanout is installed prior to lining the main pipe. Proper cleanout access, both in the upstream and downstream directions provides means for inserting an inflatable plug 82 on the upstream side of the cleanout. This mitigates odors from travelling up the pipe where dry fixture traps or defective plumbing can allow CIPP odors to enter a resident's home.

The process of temporarily plugging the service pipe also provides a primary requirement for producing an engineered pipe; that is to take the pipe out of service during the process of forming a new pipe within the old pipe. It might seem unnecessary to describe the need to take something out of service to rehabilitate it or work on it, but it is a practical requirement. The Occupational Safety and Health Administration (OSHA) requires lockout and tagout of machinery such that the machinery cannot function and is safe for technicians to make repairs. In current day CIPP practices, there are minimal measures taken to ensure flow from residents and businesses do not continue to discharge waste into the pipe while inverting and curing a resin saturated liner. This practice does not promote quality and could hinder liner performance in several ways:

Sewage mixed with the resin saturated liner may cause reduced physical properties and chemical resistance.

Flow from service pipes can cause the CIPP to remain not fully cure at service connections. The gooey resin can make it difficult to reinstate the service properly.

Flow from a service that produces head pressure on the liner could cause a lift in the liner, and debris can also become trapped between the pipe and the liner causing a bump in the flowline.

Mainline liners that are inverted using an air inversion method typically drop air pressure when the liner is fully inverted in-place. Processing cans are connected to the liner ends and the liner is inflated a second time potentially trapping flow from service pipes between the liner and the old pipe. Sewage or groundwater that collects in low pipe sections can result in a "lift" or bulge in the liner. This is an uncured section of a liner which is caused by water in contact with the liner; the water is a heat sink resulting in the liner not fully curing in that certain area. The uncured section can lift from hydraulic pressure driving water between the liner and the pipe, thereby lifting the liner. Likewise, condensation, a result of steam curing produces water that collects in pipe sags inside of the liner. The water that collects in the pipe sag acts as an insulator preventing the resin from fully curing.

Cleanouts 20 in the case for an engineered sewer rehabilitation project must be installed before any CIPP pipe rehabilitation and provide upstream and downstream access to control flow and processing emissions. The old school of thought is a cleanout needs to be directional so a rodding tool would simply follow the direction of flow. However, the vast selection of trenchless technologies has advanced allowing inspection, cleaning, and liner inversion through a T-shaped cleanout. Having a two-way (2) cleanout allows for the inflatable plug to be positioned on the upstream side of the cleanout. The two-way cleanout also provides access to prepare, rehabilitate, and maintain the service pipe in the public ROW as well as the homeowners' private lateral side. This can all be accomplished from one single cleanout. The 2-way T-shaped cleanout as described and required in ASTM F3097 utilizes a trenchless (or minimally invasive) installation method. Another option is to install two wye shaped cleanouts "back to back" to allow access in both the upstream and downstream directions. However, this option requires open cut excavation and pulling up entire flags of concrete sidewalk which is disruptive and can negatively impact residents and businesses.

Many municipal utilities today prefer less disruption and fewer complaints from residents. Trenchless cleanout methods as described in ASTM F3097 are most commonly used by municipalities. This minimally invasive process incorporates a small footprint vacuum excavation to expose a service pipe and remotely connect a special saddle through a minimally invasive bore hole. This process is fast, safe since no workers are in a trench and safely exposes surrounding utilities, is minimally disruptive to homeowners and allows for same day restoration (SDR) meaning the sidewalk, driveway, or yard is completely restored all in the same day. This is a great practice for all involved in a sewer rehabilitation project. No open holes, missing sections of sidewalk, yards torn up, driveway torn up, because at the end of each workday every vacuum excavated bore hole is completely restored to its original condition.

In order to achieve SDR, the contractor must be outfitted with the necessary tools and materials to completely compact the trench fill placed in the bore hole. Sidewalks are reinforced with dowels; a mobile cement unit and an asphalt hot box are used to make final restoration onsite the same day. Homeowner complaints are drastically minimized, and the contractor does not have to return to that location again.

It is important to provide quality informational pamphlets to homeowners; the better residents are informed of what is going on out in front of their home, the better chance they will be cooperative. Good information and communication with the residents about when to refrain from using any water can be a critical step in the process of forming a quality CIPP. Although, there are no assurances that homeowners will cooperate. For this reason, the service pipe must be temporarily taken out of service.

There are also situations such as multi-story office buildings, housing, restaurants, hospitals, schools and similar facilities where the flow must be maintained. This requires bypassing the flows to a suitable location in the collection system. When this is the case, it is preferred to install two (2) cleanouts approximately 18-inches apart. An inflatable sewer plug 82 can be positioned in the pipe section between the two cleanouts. This prevents flow from mixing with the resin saturated liner, protects building occupants, and provides access from the cleanout to the main pipe for pipe preparation, CIPP rehabilitation, and future maintenance. The second cleanout provides access to maintain uninterrupted service by inserting a suction hose into the cleanout and pumping the flows to a designated downstream manhole.

EXAMPLES

The order of operations can thus be critical to achieving the highest quality CIPP possible. Shown below are examples showing preferable orders of operations for a sewer rehabilitation project.

Initial Inspection, Measuring and Locating

Mainline are inspected using the Pipeline Assessment and Certification Program (PACP). PACP (Pipeline Assessment Certification Program) is the North American Standard for coding pipeline defect identification and assessment, providing standardization and consistency to the methods in which pipeline conditions are identified, evaluated and managed. The goal of PACP is to have pipeline system owners create a comprehensive database to properly identify, plan, prioritize, manage and renovate their pipelines based on condition evaluation.

During mainline inspection, the upstream and downstream ends of the main pipe are measured (physically, by laser measuring device or by other means). This ensures the liner is properly sized to fit the pipe.

Service laterals are inspected using the Lateral Assessment and Certification Program (LACP). The lateral launch closed circuit television (CCTV) pipe inspection system is launched from the main pipe and outfitted with pan/tilt capabilities and have various methods for locating sewer lateral pipes.

During the lateral inspection, the lateral pipe shall be measured at the main connection and at the termination of the CCTV inspection.

During the lateral inspection, the lateral pipe is accurately located (within an approximately 6-inch accuracy) at the designated location for a cleanout by the utility owner. This is typically within the ROW near the public/private property line.

Cleanout Installation

A two-way cleanout is installed. The cleanout can be installed by open cut excavation or by minimally non-invasive methods in accordance with ASTM F3097, and can be completed as disclosed in the incorporated '410 patent, as included herein.

Restoration can be scheduled based on the utility owner's requirements, or SDR.

Controlling Groundwater Influence on CIPP

Chemical grouting in accordance with ASTM F2304 is a good tool to stop active leaks that can cause resin washout.

In some locations there is so much water entering the pipe that well point pumping becomes another option for controlling groundwater.

Preparing the Main Pipe for Liner Installation

Take the pipeline out of service.

Bypass pumping the flow from an upstream manhole to a designated downstream manhole.

Inserting a plug on the upstream side of service pipe cleanouts.

Clean the main pipe removing substantially all debris including water collected in sags (low lying pipe sections).

Inserting and Curing the Main Liner

The liner is typically inverted into the pipeline. Structural glass liners are pulled-in-place.

When a resin saturated liner tube is inverted, the rate of inversion and the pressure applied should be calibrated to ensure the liner is pressing tightly against the pipe wall as the liner progresses through the pipe at a controlled rate.

Engineered end seals must be used at the terminating ends of the liner to ensure Watertightness.

An exemplary method of lining a main pipe using seals and a CIPP liner is shown and described in U.S. Pat. No. 8,640,737, which is hereby incorporated by reference in its entirety. However, it should be appreciated that other methods for positioning and forming the new pipe wall can be utilized.

Preparing the Lateral Pipes for Liner Installation

Take the main and lateral pipelines out of service by plugging and bypass pumping.

Clean the main and lateral pipes removing all debris such as grease, roots, tuberculation, and water collected in sags (low lying pipe sections).

Take measurements from the cleanout to the main pipe necessary to order a custom-tailored lateral liner that will provide a watertight connection to the mainline CIPP.

Order custom-tailored liner.

Inserting and Curing the Lateral Liner

The lateral liner is typically inverted from the main pipe connecting the main CIPP.

When a resin saturated liner tube is inverted, the rate of inversion and the pressure applied must be calibrated to ensure the liner is pressing tightly against the pipe wall as the liner progresses through the pipe at a controlled rate.

Excess resin that accumulates at the upper terminating end shall be removed through cleanout access before the resin is cured.

Engineered End Seals according to ASTM F3240 should be used at the main connection and at the terminating ends of the liner to ensure long-term watertight system.

An exemplary lateral lining system, with seals at the junction between the main and lateral pipes is shown and described in U.S. Pat. No. 7,975,726, which is hereby incorporated by reference in its entirety.

Additional embodiments, including the use of additional end seals during the repair of lateral pipes, are found in U.S. Pat. No. 6,994,118, which is hereby incorporated by reference in its entirety.

Still further either or both of the main and/or lateral lining methods could include the use of filtration for the exhaust of the curing agent and/or emissions created by the processing or crosslinking of the resin saturated liner. The filtration system can be the same or similar to the process disclosed herein.

The order of operations described above improve CIPP quality, reduce liner defects, reduce public health concerns associated with CIPP, and greatly minimize social impact on residents and business owners.

Therefore, it will be obvious to those skilled in the art that changes and/or configurations are included as part of the invention.

The invention claimed is:

1. A method for repairing a pipe system comprising a main pipe and at least one lateral pipe extending from the main pipe, the method comprising:
   first, inspecting and surveying the pipe system to measure the main and at least one lateral pipe and to locate the same;
   next, installing a cleanout to provide access to the pipe system, said cleanout extending from the lateral pipe to an area external of the pipe system;
   after the cleanout has been installed, positioning a plug in a lateral pipe at an upstream position of the cleanout relative to the main pipe;
   after the plug has been positioned, repairing the main pipe using cured-in-place pipe (CIPP); and
   after the main pipe has been repaired, repairing the at least one lateral pipe using CIPP.

2. The method of claim 1, further comprising, after installing the cleanout and before repairing the main pipe, sealing the pipe system with one or more end seals.

3. The method of claim 2, wherein the cleanout comprises a two-way cleanout.

4. The method of claim 3, further comprising positioning a filter to the two-way cleanout to filter emissions and/or exhaust from the repair of the main pipe and/or the at least one lateral pipe.

5. The method of claim 4, wherein the filter is a carbon filter.

6. The method of claim 3, further comprising:
   a. cleaning the main pipe and the at least one lateral pipe to remove debris and water before sealing the pipe system;
   b. measuring the at least one lateral pipe length measuring from the two-way cleanout to the main pipe; and
   c. using the measurements to create a lateral liner to fit the at least one lateral pipe.

7. The method of claim 3, wherein the cleanout is a tee-shaped cleanout.

8. The method of claim 3, wherein the two-way cleanout provides access to an upstream and downstream location in the pipe system.

9. A system for use with a cured-in-place pipe repair system for repairing one or more pipes of a pipe system including a main pipe, at least one lateral pipe, and a cleanout pipe extending from the lateral pipe, the system comprising:
   a resin impregnated liner positioned at least partially in the main pipe and the lateral pipe at a location downstream of the cleanout;
   a plug positioned in the lateral pipe upstream of the cleanout pipe; and
   a filtration system at the cleanout comprising a filter to receive air from within the liner.

10. The system of claim 9, wherein the filtration system further comprises a fitting at an external portion of the cleanout.

11. The system of claim 9, wherein the filtration system further comprises a fan.

12. The system of claim 11, wherein the fan creates a negative pressure within the pipe system for directing air to and through the filter.

13. The system of claim 9, further comprising a sensor at the exhaust, and wherein the at least one sensor comprises one or more of:
   a. a temperature sensor;
   b. a pressure sensor;
   c. a chemical sensor;
   d. an air quality sensor; or
   e. a flow meter.

14. A method of filtering air associated with cured-in-place pipe lining, the method comprising:
   installing a cleanout pipe from a lateral pipe that extends from a main pipe of a pipe system;
   positioning a plug in the lateral pipe upstream of the cleanout relative to the main pipe;
   repairing at least a portion of the main pipe and/or lateral pipe downstream of the cleanout pipe with a cured-in-place pipe lining system comprising a resin impregnated liner;
   directing air from within the cured-in-place pipe lining system towards a filtration system comprising a filter positioned at an external end of the cleanout pipe; and
   filtering the air with the filtration system to remove a contaminant from the air.

15. The method of claim 14, wherein the contaminated air is directed with a pressure source.

16. The method of claim 14, wherein the pressure source comprises:
   compressed air or compressed air mixed with pressurized steam used to inflate and cure a resin saturated liner;
   a positive pressure fan; or
   a vacuum.

17. The method of claim 14, further comprising sealing the pipe system with one or more end seals.

* * * * *